US012673004B1

(12) United States Patent
Gibson et al.

(10) Patent No.: US 12,673,004 B1
(45) Date of Patent: Jul. 7, 2026

(54) VEHICLE FOOT-MASSAGING SYSTEM

(71) Applicants: Kenneth Gibson, Jonesboro, GA (US); Fredric Yeadon, Jonesboro, GA (US)

(72) Inventors: Kenneth Gibson, Jonesboro, GA (US); Fredric Yeadon, Jonesboro, GA (US)

( * ) Notice: Subject to any disclaimer, the term of this patent is extended or adjusted under 35 U.S.C. 154(b) by 940 days.

(21) Appl. No.: 17/963,276

(22) Filed: Oct. 11, 2022

(51) Int. Cl.
    *A61H 23/02*     (2006.01)
    *A61H 23/00*     (2006.01)
    *B60N 3/06*     (2006.01)

(52) U.S. Cl.
    CPC ........... *A61H 23/02* (2013.01); *A61H 23/006* (2013.01); *B60N 3/06* (2013.01); *A61H 2201/0119* (2013.01); *A61H 2201/0192* (2013.01); *A61H 2201/1207* (2013.01); *A61H 2201/164* (2013.01); *A61H 2201/165* (2013.01); *A61H 2201/1654* (2013.01); *A61H 2201/1676* (2013.01); *A61H 2201/5097* (2013.01); *A61H 2205/12* (2013.01)

(58) Field of Classification Search
    CPC .... A61H 2201/0119; A61H 2201/0192; A61H 2201/1207; A61H 2201/164; A61H 2201/165; A61H 2201/1654; A61H 2201/1676; A61H 2201/5097; A61H 2205/12; A61H 23/02; A61H 23/006; B60N 3/06
    See application file for complete search history.

(56) References Cited

U.S. PATENT DOCUMENTS

| | | |
|---|---|---|
| 4,513,736 A | 4/1985 | Thurber |
| 5,018,511 A | 5/1991 | Yokoi |
| 5,087,036 A * | 2/1992 | Cooper ................. A63B 23/085 |
| | | 482/79 |
| 5,158,073 A | 10/1992 | Bukowski |
| 5,501,682 A * | 3/1996 | Edwards-Cofie ...... A61H 23/02 |
| | | 601/16 |
| 6,863,869 B2 | 3/2005 | Lau |
| 7,297,126 B2 | 11/2007 | Kries |
| 8,500,664 B2 | 8/2013 | Numata |
| 10,604,052 B2 | 3/2020 | Kim |
| 10,857,065 B2 | 12/2020 | Wu |
| 2010/0036296 A1 * | 2/2010 | Sancho Serrats .... A47C 16/025 |
| | | 601/31 |
| 2013/0038107 A1 * | 2/2013 | Tamura .................... B60N 2/20 |
| | | 297/331 |
| 2021/0045966 A1 | 2/2021 | Melnyk |

FOREIGN PATENT DOCUMENTS

| | | | | |
|---|---|---|---|---|
| CN | 104688515 A | * | 6/2015 | ............. A61H 39/04 |
| CN | 106038253 A | * | 10/2016 | ............. A61H 23/02 |
| CN | 107374939 A | * | 11/2017 | ............. A61N 2/002 |
| KR | 101606682 B1 | * | 3/2016 | ............. A61H 39/04 |
| WO | WO-2018221102 A1 | * | 12/2018 | ............... B60N 3/06 |

* cited by examiner

*Primary Examiner* — Tu A Vo
*Assistant Examiner* — Kelsey E Baller
(74) *Attorney, Agent, or Firm* — Kyle A. Fletcher, Esq.

(57) ABSTRACT

The vehicle foot-massaging system is a therapeutic device. vehicle foot-massaging system is adapted for use with a patient. The vehicle foot-massaging system comprises a vehicle, a massage structure, a control structure, and a plurality of footwear. The massage structure and the control structure mount in the vehicle. The control structure controls the operation of the massage structure. The plurality of footwear are worn by the patient. The feet of the patient rest on the massage structure. The massage structure massages the soles of the feet of the patient.

10 Claims, 4 Drawing Sheets

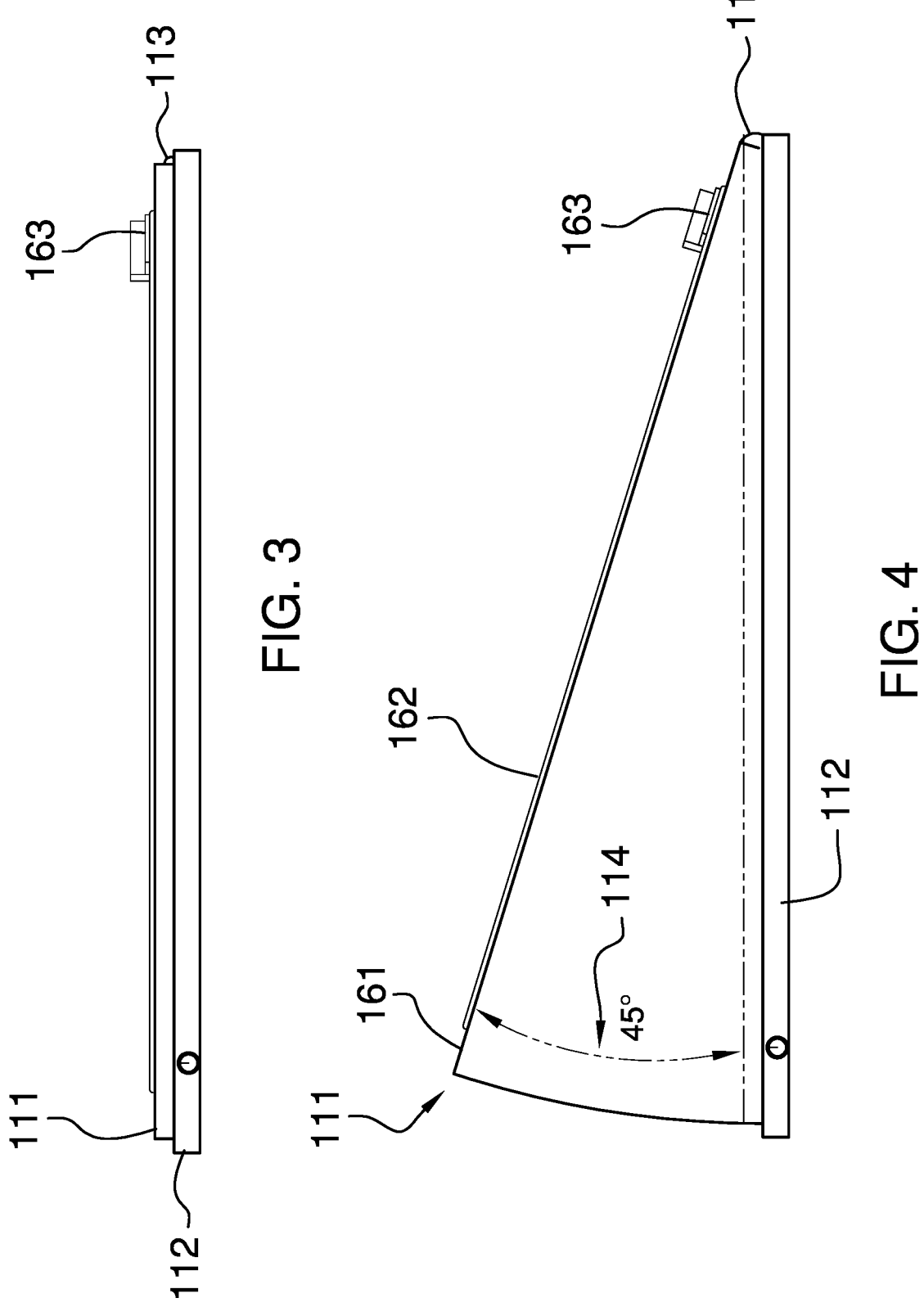

VEHICLE FOOT-MASSAGING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of devices for percussion and vibration massage. (61H23/04)

SUMMARY OF INVENTION

The vehicle foot-massaging system is a therapeutic device. vehicle foot-massaging system is adapted for use with a patient. The vehicle foot-massaging system comprises a vehicle, a massage structure, a control structure, and a plurality of footwear. The massage structure and the control structure mount in the vehicle. The control structure controls the operation of the massage structure. The plurality of footwear are worn by the patient. The feet of the patient rest on the massage structure. The massage structure massages the soles of the feet of the patient.

These together with additional objects, features and advantages of the vehicle foot-massaging system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle foot-massaging system in detail, it is to be understood that the vehicle foot-massaging system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle foot-massaging system.

It is therefore important that the claims be regarded as including such equivalent construction insofar as they do not depart from the spirit and scope of the vehicle foot-massaging system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 3 is a side view of an embodiment of the disclosure.

FIG. 4 is a side view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
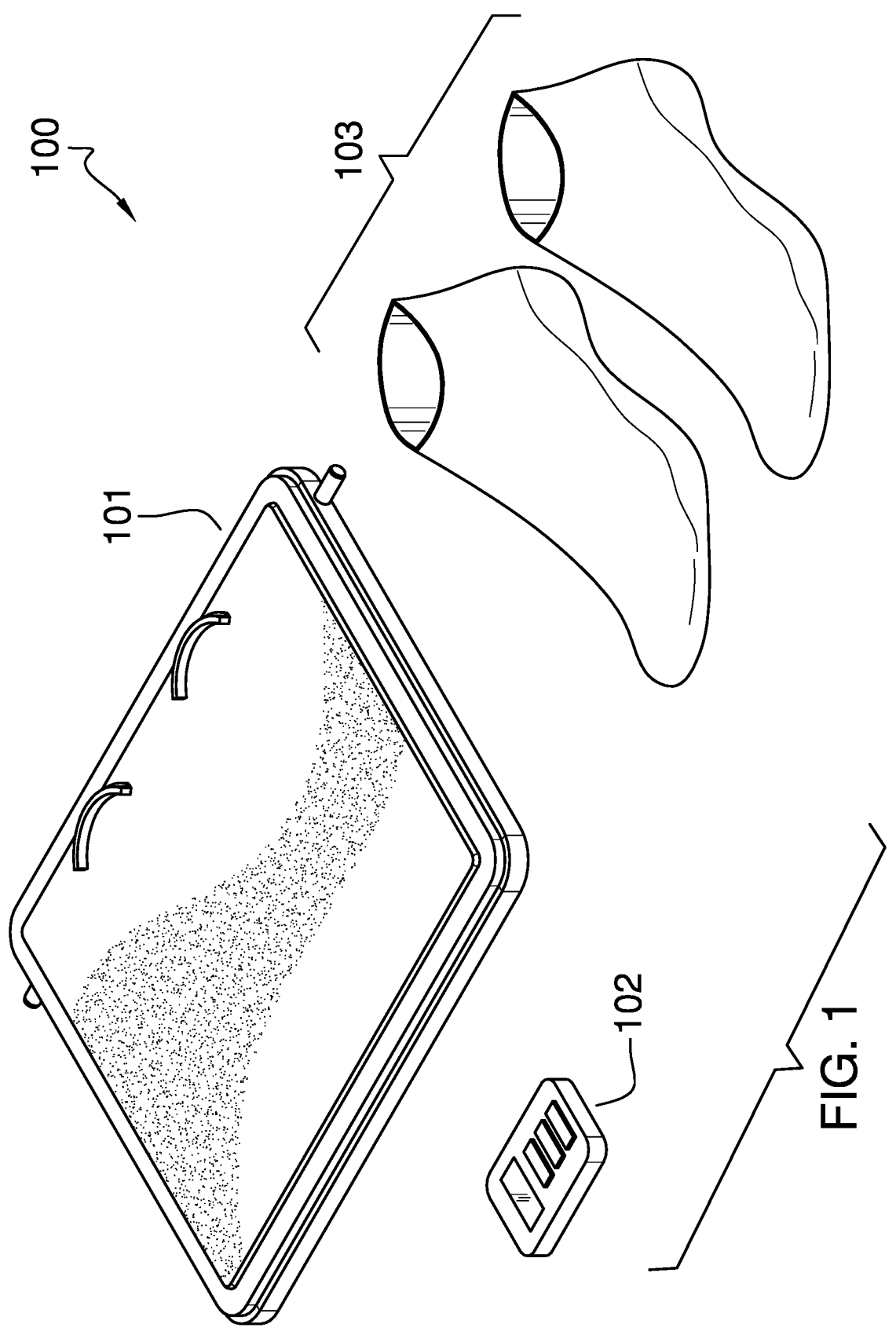
FIG. 1 is a perspective view of an embodiment of the disclosure.
Figure 2:
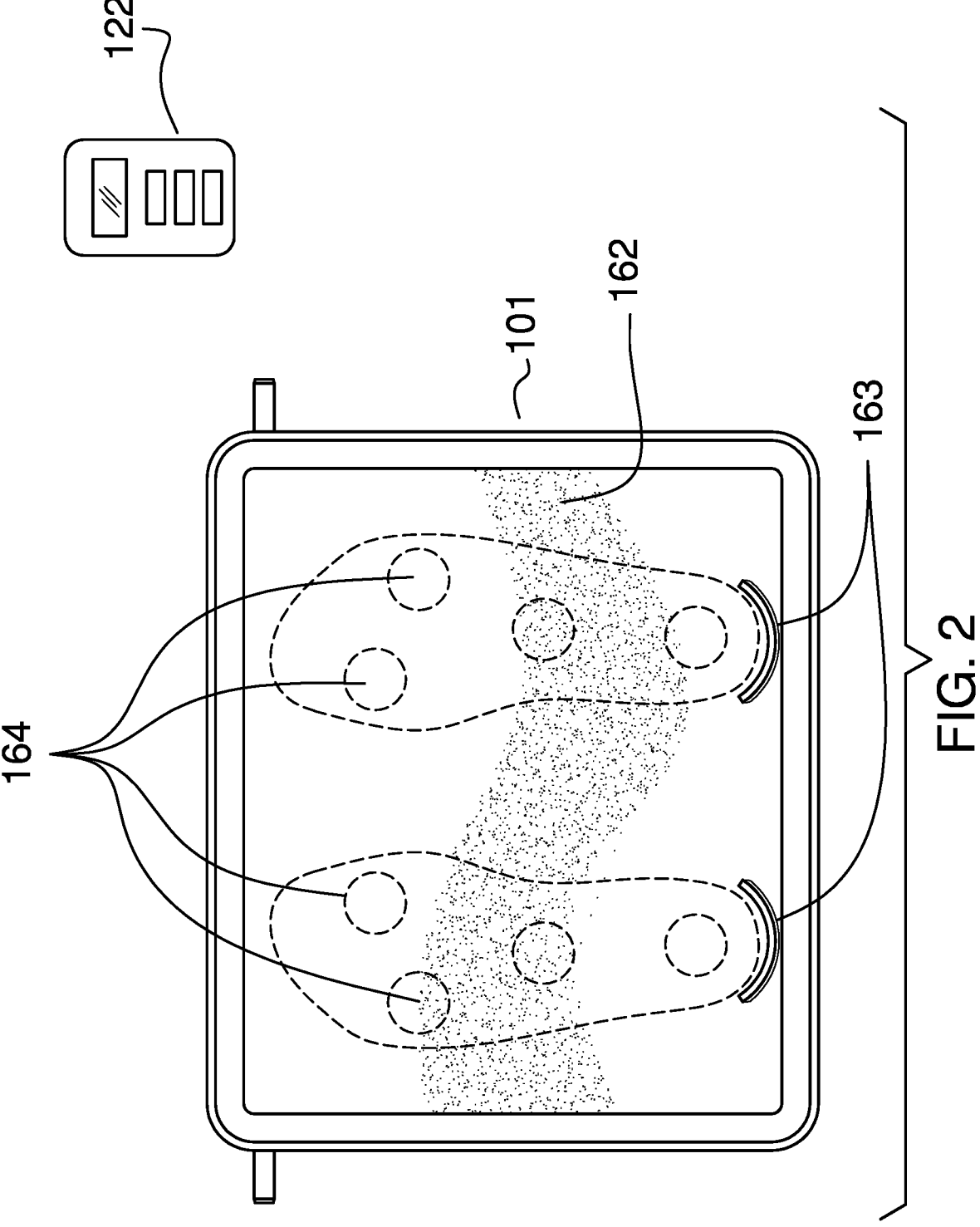
FIG. 2 is a top view of an embodiment of the disclosure.
Figure 5:
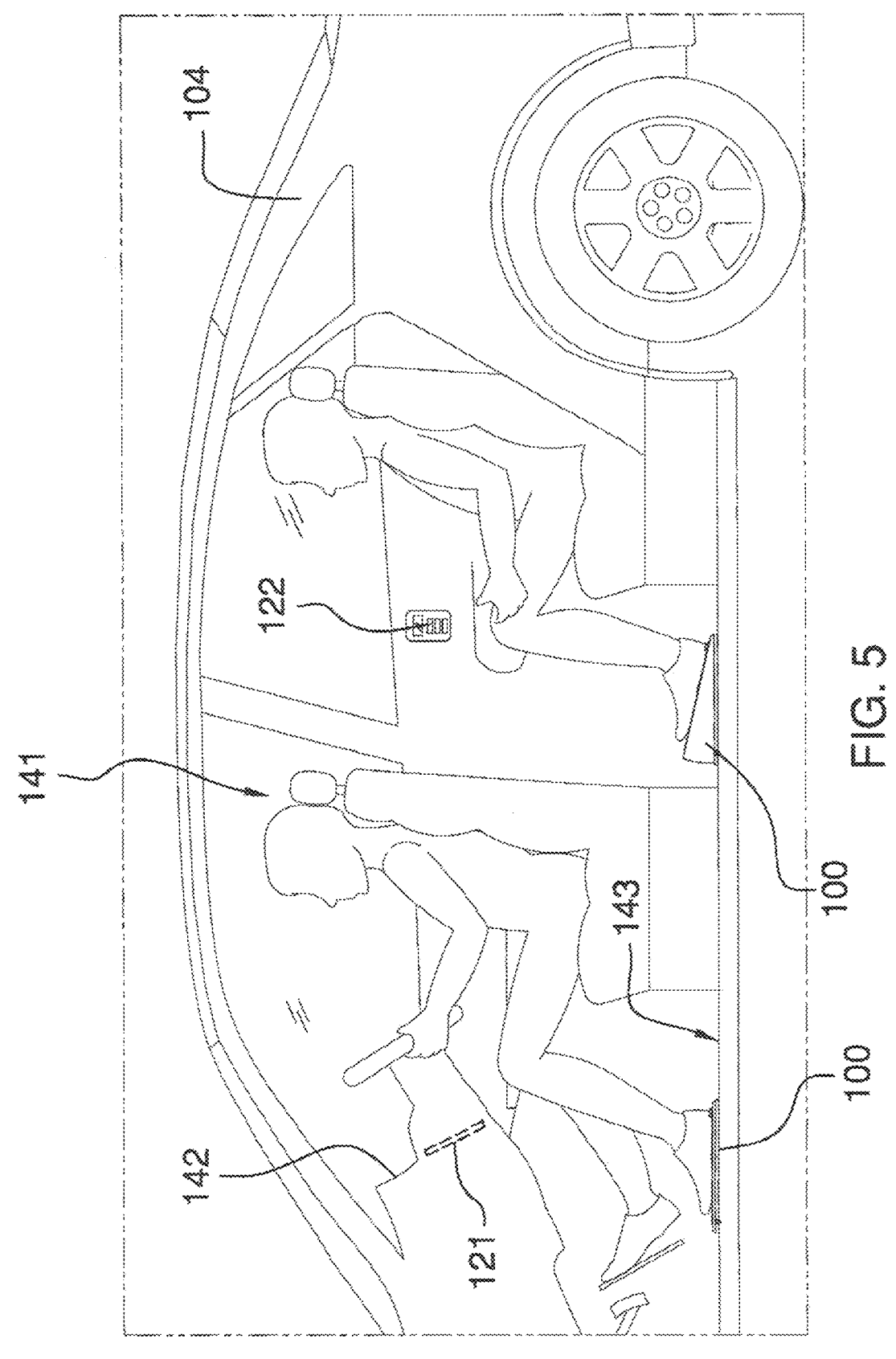
FIG. 5 is an in-use view of an embodiment of the disclosure.

Detailed reference will now be made to one or more potential embodiments of the disclosure, which are illustrated in FIGS. 1 through 5.

The vehicle foot-massaging system 100 (hereinafter invention) is a therapeutic device. The invention 100 is adapted for use with a patient. The invention 100 comprises a vehicle 104, a massage structure 101, a control structure 102 and a plurality of footwear 103. The massage structure 101 and the control structure 102 mount in the vehicle 104. The control structure 102 controls the operation of the massage structure 101. The plurality of footwear 103 are worn by the patient. The feet of the patient rest on the massage structure 101. The massage structure 101 massages the soles of the feet of the patient.

The vehicle 104 is defined elsewhere in this disclosure. The cab 141 is defined elsewhere in this disclosure. The dashboard 142 is defined elsewhere in this disclosure. The floor 143 refers to the inferior supporting surface of the cab 141 of the vehicle 104.

The massage structure 101 is a mechanical structure. The massage structure 101 mounts on the floor 143 of the cab 141 of the vehicle 104. The massage structure 101 is an electrically powered device. The massage structure 101 draws electric energy from the vehicle 104. The massage structure 101 converts the drawn electric energy into a mechanical motion that massages the soles of the foot of the vehicle 104. The cant of the massage structure 101 relative to the force of gravity is adjustable.

The massage structure 101 comprises a pedestal plate 111, a massage plate 112, and a hinge structure 113. The hinge structure 113 forms a fastening device that secures the pedestal plate 111 to the massage plate 112.

The pedestal plate 111 is a rigid structure. The pedestal plate 111 is a disk shaped structure. The pedestal plate 111 forms a pedestal that transfers the load of the massage structure 101 to the floor 143 of the vehicle 104.

The massage plate 112 is a rigid structure. The massage plate 112 is a disk shaped structure. The massage plate 112 draws electric energy from the vehicle 104. The massage plate 112 converts the drawn electric energy into a mechanical motion that massages the soles of the foot of the vehicle 104. The massage plate 112 rotates relative to the pedestal plate 111. The cant of the massage plate 112 relative to the pedestal plate 111 is adjustable. The massage plate 112 is positioned such that the feet of the patient rest on the massage plate 112.

The massage plate 112 comprises a massage face 161, a foam layer 162, a plurality of heel supports 163, and a plurality of massaging units 164. The foam layer 162, the plurality of heel supports 163, and the plurality of massaging units 164 mount on the massage face 161.

The massage face 161 is the superior congruent end of the disk structure of the massage plate 112. The massage face 161 forms the superior congruent end of the disk structure of the massage plate 112. The massage face 161 is positioned within the cab of the vehicle 104 such that the massage face 161 is accessible to the feet of the patient.

The foam layer 162 is a cushion that is positioned between the massage face 161 and the feet of the patient. The foam layer 162 is formed such that the massaging motions generated by the massage plate 112 pass through the foam layer 162 to the feet of the patient.

The plurality of heel supports 163 is a mechanical structure. The plurality of heel supports 163 mounts on the massage face 161 of the massage plate 112. The plurality of heel supports 163 forms a structure that prevents the feet of the patient from sliding off of the massage plate 112 when the massage plate 112 forms the cant 114 with the pedestal plate 111.

The plurality of massaging units 164 forms the electromechanical device that generates the massaging motion of the massage structure 101. The plurality of massaging units 164 mount in the massage face 161 of the massage plate 112. The plurality of massaging units 164 mounts on the massage face 161 such that the foam layer 162 is sandwiched between the feet of the patient and the plurality of massaging units 164. The plurality of massaging units 164 is controlled by the control panel 121 of the control structure 102.

The pedestal plate 111 and the massage plate 112 combine to form a cant 114. The cant 114 is an angle that is formed between the pedestal plate 111 and the massage plate 112. Specifically, the cant 114 is the interior angle formed between the congruent ends of the disk structure of the pedestal plate 111 and the congruent ends of the disk structure of the massage plate 112.

The hinge structure 113 is a fastening device. The hinge structure 113 forms a hinge that attaches the massage plate 112 to the pedestal plate 111. The hinge structure 113 is a rotating structure. The hinge structure 113 attaches the massage plate 112 to the pedestal plate 111 such that the massage plate 112 rotates relative to the pedestal plate 111. The hinge structure 113 is a locking hinge. The hinge structure 113 locks the cant 114 between the massage plate 112 and the pedestal plate 111 into a fixed position.

The control structure 102 is an electric circuit. The control structure 102 controls the operation of the massage structure 101. The control structure 102 mounts in the cab 141 of the vehicle 104. The control structure 102 is a remotely controlled device. The control structure 102 comprises a control panel 121 and a remote control 122.

The control panel 121 is an electrical device. The control panel 121 mounts on the dashboard 142 of the vehicle 104 such that the control panel 121 is accessible by the driver of the vehicle 104. The control panel 121 controls the operation of the massage plate 112 of the massage structure 101. By controlling the operation of the massage plate 112 is meant that the control panel 121: a) initiates the operation of the massage plate 112; b) discontinues the operation of the massage plate 112; and c) adjusts the operating parameters of the massage plate 112 to meet the preferences of the patient using the invention 100.

The remote control 122 is a radio frequency device. The remote control 122 forms a wireless communication link with the control panel 121. The remote control 122 remotely controls the operation of the control panel 121. By remotely controlling the operation of the control panel 121 is meant that: a) the remote control 122 transmits operating instructions to the control panel 121 regarding the operation of the massage plate 112; and b) the control panel 121 implements the operating instructions received from the remote control 122.

Each footwear item selected from the plurality of footwear items 103 is a protective garment worn on a foot of the patient. Each selected footwear item forms a protected space that encloses the foot of the patient. Each selected footwear item is a flexible structure. The flexible nature of each selected footwear item allows the massaging motions generated by the massage structure 101 to pass through the selected footwear item to massage the foot of the patient.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Angle: As used in this disclosure, an angle is a measure of a region between two intersecting lines or surfaces.

Angle, Interior: As used in this disclosure, an interior angle is a cant that is formed within the concave region of a curved structure.

Arc: As used in this disclosure, an arc refers to a portion of a circumference or a curved perimeter. When applied to an angle or cant, the arc also refers to a measure of an angular span as measured from a circle at the vertex formed by the sides of the angle.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Dashboard: As used in this disclosure, a dashboard is a mechanical structure that mounts underneath the front windshield of a motorized vehicle. The dashboard contains operating controls and instrumentation of the motorized vehicle are mounted in the dashboard. A dashboard is also referred to as a console.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Elevation: As used in this disclosure, elevation refers to the span of the distance in the superior direction between a specified horizontal surface and a reference horizontal surface.

Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Foot: As used in this disclosure, the foot refers to the portion of the leg that is below the ankle. Within this disclosure, the foot is further defined with a forefoot, a midfoot, a hindfoot, and a sole. The forefoot is the region of the foot is the anterior portion of the foot within which the phalanges and the metatarsals bones are located. The midfoot is the region of the foot within which the navicular, cuboid, and cuneiform bones are located. The hindfoot is the region of the foot that is posterior to the midfoot. The sole refers to the inferior surfaces of the foot located underneath the forefoot, the midfoot, and the hindfoot. The health foot further comprises five toes formed at the distal end of the forefoot.

Footwear: As used in this disclosure, footwear refers to a protective structure that is worn on a foot. Footwear is commonly referred to as a shoe.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Heel: As used in this disclosure, the heel is the portion of the sole or the outsole that is underneath the ankle and posterior to the arch of the foot of the wearer.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Kneading: As used in this disclosure, to knead refers to the folding, pressing a stretching of a collection of materials for the purpose of forming a uniform mass. The term kneading may further refer to a motion similar to the kneading motion that is used during massage activities.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Massage: As used in this disclosure, a massage is a therapeutic process wherein the muscles of the body are kneaded for the purpose of aiding circulation and relaxing the muscles.

Motor: As used in this disclosure, a motor refers to the method of transferring energy from an external power source into mechanical energy.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Patient: As used in this disclosure, a patient is a person who is designated to receive a medical treatment, therapy, or service. The term patient may be extended to an animal when used within the context of the animal receiving veterinary treatment or services.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Pivot: As used in this disclosure, a pivot is a rod or shaft around which an object rotates or swings.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a 14 cylinder.

Remote Control: As used in this disclosure, remote control means the establishment of control of a device from a distance. Remote control is generally accomplished through the use of an electrical device that generates electrically based control signals that are transmitted via radio frequencies or other means to the device.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Therapeutic: As used in this disclosure, therapeutic is an adjective that refers to a medical, ameliorative, or hygienic substance, process, procedure, or device.

Sole: As used in this disclosure, the sole component of a shoe that forms the undersurface of the shoe and comes in contact with the ground. The portion of a foot that is in contact with the ground is also referred to as the sole.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Vibration Motor: As used in this disclosure, a vibration motor is an electric motor that rotates an unbalanced weight in such a manner that the electric motor vibrates during operation. The vibration can be varied by varying the rotational speed of the vibration motor. The rotational speed is varied by varying the electric current flowing through the vibration motor.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle foot-massaging system comprising;
a massage structure, a control structure and a plurality of footwear;
wherein the massage structure and the control structure are configured to be placed in a vehicle;
wherein the control structure controls the an operation of the massage structure;
wherein the massage structure is configured to draw electric energy from the vehicle, and convert said drawn electric energy into a mechanical motion that is adapted to massage soles of feet of a user inside the vehicle;
wherein the massage structure comprises a pedestal plate, a massage plate, and a hinge structure;
wherein the hinge structure forms a fastening device that secures the pedestal plate to the massage plate;
wherein the massage plate rotates relative to the pedestal plate;
wherein the massage plate comprises a massage face, a foam layer, a plurality of heel supports, and a plurality of massaging units;
wherein the massage units comprise an electromechanical vibrator;
wherein the foam layer, the plurality of heel supports, and the plurality of massaging units mount on the massage face;
wherein the plurality of massaging units mounts on the massage face such that the foam layer is positioned above the plurality of massaging units and below the soles of feet of the user when in use;
wherein the pedestal plate and the massage plate combine to form a cant;
wherein the cant is an angle that is formed between the pedestal plate and the massage plate;
wherein the cant is the interior angle formed between the congruent ends of the pedestal plate and the congruent ends of the massage plate;
wherein the massage plate is adjustable via the hinge structure between a first substantially flat position and a second position; and
wherein in the first substantially flat position the massage structure is in a collapsed state where the pedestal plate is substantially parallel with the massage plate to form a singular plate and in the second position the cant angle is adjustable between greater than 0 degrees and 45 degrees to form a wedge.

2. The vehicle foot-massaging system according to claim 1
wherein the massage structure is a mechanical structure;
wherein the massage structure is an electrically powered device; and
wherein the cant of the massage structure relative to the force of gravity is adjustable.

3. The vehicle foot-massaging system according to claim 2 wherein the control structure is an electric circuit;
wherein the control structure controls the operation of the massage structure;
wherein the control structure mounts in the cab of the vehicle; and
wherein the control structure is a remotely controlled device.

4. The vehicle foot-massaging system according to claim 3
wherein the pedestal plate is a rigid structure;
wherein the pedestal plate is a disk shaped structure; and
wherein the pedestal plate forms a pedestal that transfers the load of the massage structure to the floor of the vehicle.

5. The vehicle foot-massaging system according to claim 4
wherein the massage plate is a rigid structure;
wherein the massage plate is a disk shaped structure;
wherein the massage plate draws electric energy from the vehicle;
wherein the massage plate converts the drawn electric energy into a mechanical motion that massages the soles of feet of the user inside the vehicle; and
wherein the cant of the massage plate relative to the pedestal plate is adjustable.

6. The vehicle foot-massaging system according to claim 5
wherein the massage face is the superior congruent end of the disk structure of the massage plate;
wherein the massage face forms the superior congruent end of the disk structure of the massage plate;
wherein the foam layer is a cushion that is positioned superior congruent end of the disk structure of the massage plate;
wherein the plurality of heel supports is a mechanical structure; and
wherein the plurality of heel supports mounts on the massage face of the massage plate.

7. The vehicle foot-massaging system according to claim 6
wherein the plurality of massaging units forms the electromechanical device that generates the massaging motion of the massage structure;
wherein the plurality of massaging units mount in the massage face of the massage plate; and
wherein the plurality of massaging units is controlled by the control panel of the control structure.

8. The vehicle foot-massaging system according to claim 7
wherein the hinge structure is the fastening device;
wherein the hinge structure forms a hinge that attaches the massage plate to the pedestal plate;
wherein the hinge structure is a rotating structure;
wherein the hinge structure attaches the massage plate to the pedestal plate such that the massage plate rotates relative to the pedestal plate;
wherein the hinge structure is a locking structure; and
wherein the hinge structure locks the cant between the massage plate and the pedestal plate into a fixed position.

9. The vehicle foot-massaging system according to claim 8
wherein the control structure comprises a control panel and a remote control;
wherein the control panel is an electrical device;

wherein the control panel mounts on the dashboard of the
vehicle such that the control panel is accessible by the
driver of the vehicle;

wherein the control panel controls the operation of the
massage plate of the massage structure;

wherein by controlling the operation of the massage plate
is meant that the control panel: a) initiates the operation
of the massage plate; b) discontinues the operation of
the massage plate; and c) adjusts the operating param-
eters of the massage plate;

wherein the remote control is a radio frequency device;

wherein the remote control forms a wireless communica-
tion link with the control panel;

wherein the remote control remotely controls the opera-
tion of the control panel; and wherein by remotely controlling the operation of the
control panel is meant that: a) the remote control
transmits operating instructions to the control panel
regarding the operation of the massage plate; and b) the
control panel implements the operating instructions
received from the remote control.

10. The vehicle foot-massaging system according to claim
9 wherein each footwear item selected from the plurality of
footwear items is a protective garment; and wherein each selected footwear item is a flexible struc-
ture.

\* \* \* \* \*